(12) United States Patent
Husberg et al.

(10) Patent No.: US 10,882,394 B2
(45) Date of Patent: Jan. 5, 2021

(54) ACTUATING DEVICE FOR A MOVABLE PART

(71) Applicant: Hella KGaA Hueck & Co., Lippstadt (DE)

(72) Inventors: Olaf Husberg, Warburg (DE); Henning Irle, Lippstadt (DE); Ingo Niemeyer, Moehnesee (DE)

(73) Assignee: Hella KGaA Hueck & Co., Lippstadt (DE)

( * ) Notice: Subject to any disclaimer, the term of this patent is extended or adjusted under 35 U.S.C. 154(b) by 590 days.

(21) Appl. No.: 15/664,381

(22) Filed: Jul. 31, 2017

(65) Prior Publication Data

US 2017/0326973 A1 Nov. 16, 2017

Related U.S. Application Data

(63) Continuation of application No. PCT/EP2016/051699, filed on Jan. 27, 2016.

(30) Foreign Application Priority Data

Jan. 30, 2015 (DE) .................... 10 2015 001 180

(51) Int. Cl.
*E05B 83/34* (2014.01)
*B60K 15/05* (2006.01)
(Continued)

(52) U.S. Cl.
CPC .............. *B60K 15/05* (2013.01); *E05B 81/20* (2013.01); *E05B 81/28* (2013.01); *E05B 81/77* (2013.01);
(Continued)

(58) Field of Classification Search
CPC ........... B60K 2015/0576; E05B 65/104; E05B 81/20; E05B 81/28; E05B 83/28; E05B 83/34; E05B 47/0009
See application file for complete search history.

(56) References Cited

U.S. PATENT DOCUMENTS 3,416,823 A * 12/1968 Auer .................... F16B 37/00
403/408.1
3,915,491 A * 10/1975 Montgomery ......... B60K 15/05
296/97.22
(Continued)

FOREIGN PATENT DOCUMENTS

DE 1815720 A1 * 6/1970 ......... E05B 47/0009
DE 10301798 A1 * 7/2004 ............. E05B 81/25
(Continued)

*Primary Examiner* — Carlos Lugo
(74) *Attorney, Agent, or Firm* — Muncy, Geissler, Olds & Lowe, P.C.

(57) ABSTRACT

An actuating device for a movable part, in particular a cover of a vehicle body opening, including at least one actuator and at least one electromechanical switching element. The electromechanical switching element is changeable between a first mode and a second mode. In the first mode, the electromechanical switching element senses an actuation by the actuator and in the second mode, the electromechanical switching element releases the actuator such that the actuator can be moved toward the movable part. The electromechanical switching element has an electroactive polymer and/or a piezoelectric element.

6 Claims, 4 Drawing Sheets

(51) Int. Cl.
 *E05B 81/76* (2014.01)
 *E05B 81/28* (2014.01)
 *E05B 81/20* (2014.01)

(52) U.S. Cl.
 CPC ........ *E05B 83/34* (2013.01); *B60K 2015/053* (2013.01); *B60K 2015/0515* (2013.01); *B60K 2015/0576* (2013.01); *B60K 2015/0584* (2013.01)

(56) References Cited

U.S. PATENT DOCUMENTS

| | | | | |
|---|---|---|---|---|
| 4,277,094 A * | 7/1981 | Roue | ...................... | B60K 15/05 296/97.22 |
| 4,753,465 A * | 6/1988 | Dalby | ................... | B64G 1/645 244/173.3 |
| 4,806,815 A * | 2/1989 | Honma | ................... | F03G 7/065 310/307 |
| 5,119,555 A * | 6/1992 | Johnson | ................ | B23P 11/025 29/254 |
| 5,265,456 A * | 11/1993 | Kennedy | ................ | B23P 9/025 29/447 |
| 5,771,742 A * | 6/1998 | Bokaie | ..................... | B64G 1/22 337/140 |
| 5,836,638 A * | 11/1998 | Slocum | .................. | B60K 15/05 296/97.22 |
| 6,008,992 A * | 12/1999 | Kawakami | .......... | E05B 47/0009 292/137 |
| 6,310,411 B1 * | 10/2001 | Viallet | ............... | H01H 61/0107 307/125 |
| 6,762,669 B2 * | 7/2004 | Alacqua | ................. | F03G 7/065 337/123 |
| 6,783,167 B2 * | 8/2004 | Bingle | .................... | E05B 83/26 292/DIG. 43 |
| 6,948,685 B2 * | 9/2005 | Hawthorne | ........ | E05B 47/0002 244/129.1 |
| 7,331,616 B2 * | 2/2008 | Brei | .................... | E05B 47/0009 292/100 |
| 7,377,559 B2 * | 5/2008 | Gramss | .................. | B60K 15/05 220/211 |
| 8,398,127 B2 * | 3/2013 | Persiani | ................ | E05C 19/022 292/163 |
| 8,579,535 B2 * | 11/2013 | Crane | ................... | F16B 1/0014 403/28 |
| 8,845,001 B2 * | 9/2014 | Kotama | .................. | B60L 53/16 296/97.22 |
| 9,010,836 B2 * | 4/2015 | Watanabe | ............. | E05C 19/022 296/97.22 |
| 9,180,525 B2 * | 11/2015 | Park | ....................... | B23B 31/02 |
| 2005/0198904 A1 * | 9/2005 | Browne | ............. | E05B 47/0009 49/374 |
| 2006/0019510 A1 * | 1/2006 | Rudduck | ................ | H05K 7/142 439/74 |
| 2006/0060408 A1 * | 3/2006 | Kalliske | ................. | B60R 21/38 180/274 |
| 2009/0282879 A1 * | 11/2009 | Marcelle | ............. | E05B 47/0603 70/277 |
| 2009/0299502 A1 | 12/2009 | Mankame et al. | | |
| 2010/0045049 A1 | 2/2010 | Persiani et al. | | |
| 2016/0108648 A1 * | 4/2016 | Nam | ................... | E05B 17/0037 292/142 |
| 2016/0375761 A1 * | 12/2016 | Horikawa | .............. | B60K 15/05 49/276 |

FOREIGN PATENT DOCUMENTS

| | | | | |
|---|---|---|---|---|
| DE | 10 2014 106 846 A1 | 11/2014 | | |
| EP | 1350655 A1 * | 10/2003 | ........... | E05B 47/026 |
| EP | 1410936 A2 * | 4/2004 | ........... | E05B 83/34 |
| EP | 1 785 307 A1 | 5/2007 | | |
| EP | 2082914 A1 * | 7/2009 | ........... | E05B 83/34 |
| GB | 2149447 A * | 6/1985 | ........... | E05B 83/34 |
| JP | 07293078 A * | 11/1995 | | |
| KR | 20110138912 A | 11/2014 | | |

\* cited by examiner

ACTUATING DEVICE FOR A MOVABLE PART

This nonprovisional application is a continuation of International Application No. PCT/EP2016/051699, which was filed on Jan. 27, 2016, and which claims priority to German Patent Application No. 10 2015 001 180.4, which was filed in Germany on Jan. 30, 2015, and which are both herein incorporated by reference.

BACKGROUND OF THE INVENTION

Field of the Invention

The present invention relates to an actuating device for a movable part, in particular a cover of a vehicle body opening.

Description of the Background Art

It is known that covers such as, e.g., fuel caps for vehicles and furniture drawers have closing devices that can be locked and unlocked via a so-called push-push mechanism. Said push-push functions are also known from ballpoint pens, whereby a stylus is moved with the aid of a spring in a cardioid mechanism, so that the stylus is both extended and retracted solely by pressing the push button. Such a push-push locking mechanism, which opens or closes a movable part, is known from US 2010045049 A1, the mechanism having a cardioid mechanism.

A generic push-push mechanism for a fuel cap of a vehicle is also known from DE 10 2014 106 846 A1.

The high cost involved in using separate sensors and actuators and the associated complicated cabling are disadvantageous in the prior-art solutions. In addition, the complex and in part error-prone push-push elements are large-volume solutions, which moreover have a relatively large mass.

SUMMARY OF THE INVENTION

It is therefore an object of the present invention to overcome the above-described disadvantages. It is also an object of the present invention in particular to save weight in a cost-effective and simple manner by eliminating mechanical and electromotive components and to realize an improved combination of mechanical and electronic components.

An actuating device of the invention can be used to release a movable part, release being understood to mean a sensory and mechanical release. For this purpose, the actuating device has at least one actuator and an electromechanical switching element, whereby the electromechanical switching element can be brought from a first mode into a second mode by the actuator, so that in the first mode the electromechanical switching element senses an actuation by the actuator and in the second mode the electromechanical switching element releases the actuator, and the actuator can be moved toward the movable part. An actuating device of the invention is characterized in that a switch between the first and second mode and vice versa can be realized by the actuator by actuating the electromechanical switching element.

An actuating device of the invention is therefore based on the use of a sensor-actuator module, which is in the first mode by default, in which an actuation by the actuator can be sensed, and the electromechanical switching element is switched into a second mode only after the actuation, in which mode it functions as an actuator.

This results in an on-demand response of the locking, as a result of which mechanical components, as they are used in current systems, can be reduced. Thus, for example, the cardioid mechanism of the push-push element can be omitted, which reduces cost and increases the reliability and durability. The significant reduction of components and installation space results in a prolonged actuator lifetime and a cost-effective and weight-saving structural design. Accordingly, the actuator can be adapted to the new lifetime requirements by a simple structural design, which is also cost-effective. In the second mode, the actuator is released, so that it moves toward the movable part and causes a change in the position of the movable part, so that the movable part is accessible by a user in such a way that he can change the position of the movable part. In this regard, it is conceivable that the movable part is originally in a closed position in which it is not permitted or possible for the user to move the movable part out of the closed position. If the electromechanical switching element releases the actuator, so that the actuator can be moved toward the movable part and the movable part is moved out of its original position, the user can grasp it or apply force such that access to the covered opening is granted. It must be pointed out, however, that the change from the first mode to the second mode can also be carried out conversely, so that the electromechanical switching element can be brought out of the second mode into the first mode by actuation of the electromechanical switching element by the actuator. It can be achieved, therefore, that the movable part is moved back into its original position, in which the actuator is moved in the opposite direction, therefore away from the movable part, and the electromechanical switching element is then again in the first mode, in which an actuation can be sensed by the actuator. According to the invention, there is an operative connection, which enables a force to be transmitted, between the actuator and the movable part. In this regard, the actuator, for example, can be fastened to the movable part or be made integrally with it. Because of the connection, the actuator moves concurrently in the event that the movable part moves. In this case, the actuator can be moved completely out of the electromechanical switching element. In a closing process, in which the movable part is moved into its original position, the actuator is moved thereby into, through, and past the electromechanical switching element, so that depending on the design it is possible here to again sense a change in capacitance. A further option is to connect the movable part and the actuator via a hook connection. After the actuator is released by the electromechanical switching element, the actuator can move on a circular path, as a result of which in the opened state, the hook is no longer operatively connected to the actuator. In this case, the hook can be attached both to the movable part and to the actuator.

It can be of advantage if in an actuating device of the invention an electronic unit controls the modes of the electromechanical switching element. To this end, the electromechanical switching element is connected to the electronic unit in such a way that when an actuation by the actuator is sensed, a signal is sent to the electronic unit, it is evaluated by the electronic unit, and a corresponding signal is sent back to the electromechanical switching element. Consequently, a change from the first mode into the second mode and vice versa can be controlled. Therefore, the electromechanical switching element in the first mode detects a force application by the actuator; this is evaluated by the electronic unit and it decides whether a change in mode of the electromechanical switching element is to be carried out. The electronic unit can be used additionally to control possible dead times, which exist because unwanted and wrongly performed changes in mode occur which are caused by an incorrectly effected actuation of the actuator. If further sensing by the actuator occurs during an aforementioned dead time, this can be wrongly interpreted as a wish to release the actuator, although there is only the intent to move the movable part and thereby the actuator back to its original position. Consequently, this malfunction is advantageously prevented by the use of an electronic unit of the invention.

It is conceivable according to the invention that a first spring element acts on the actuator, as a result of which the actuator can be changed in its position. In this case, the actuator is operatively connected to the spring element, so that it can be acted upon by a spring force. Consequently, the actuator can be changed in its position by the spring force applied by the spring element in the released state. For this purpose, the spring relaxes, as a result of which a change in the movement of the actuator occurs so that the actuator can be moved toward the movable part.

It is also advantageous, if a locking mechanism, which can be brought into an open position and a closed position by the electromechanical switching element, is situated on the electromechanical switching element, in particular that the locking mechanism is operatively connected to at least one second spring element. The locking mechanism is used to prevent the actuator from moving toward the movable part, if the latter is in the closed position. A mechanical operative connection between the locking mechanism and the actuator prevents the actuator from moving toward the movable part either by the first spring element or by a force application to the actuator from outside. The locking mechanism when in the open position releases the actuator, so that the actuator can be moved toward the movable part. The locking mechanism hereby successfully prevents the actuator from moving toward the movable part and mistakenly releasing an opening in the event of failure or malfunction of the electromechanical switching element. It can be advantageous in this case, if the locking mechanism is operatively connected to at least one second spring element. In the first mode, the second spring element presses the locking mechanism toward the electromechanical switching element, so that a movement of the actuator toward the movable part is prevented. In the second mode, a force of the electromechanical switching element acts on the locking mechanism and therefore against the second spring element, whereby the amount of force of the electromechanical switching element is greater than the amount of force of the second spring element, so that the locking mechanism can be brought out of the closed position into the open position. Advantageously, the locking mechanism is in the closed position, if the electromechanical switching element is in the first mode. Conversely, it is advantageous if the locking mechanism is in an open position if the electromechanical switching element is in the second mode.

It is conceivable according to the invention that a mechanical emergency mechanism is provided, with which the movable part can be actuated in a purely mechanical manner, in particular can be brought into an open position. In this case, the operative connection between the movable part and the actuator can be separated by the emergency mechanism, so that the movable part can also be at least opened in the event of a power failure. In this case, the emergency mechanism can be actuated, e.g., with a Bowden cable, which can be actuated at an accessible place by an authorized user. In particular, the emergency mechanism can be actuated only in an emergency, so that it can be ruled out that an unauthorized user can open the movable part.

A further advantage is achievable, if the electromechanical switching element has an electroactive polymer or a shape-memory alloy or a piezoelectric element. All three types can be placed in the category of artificial muscles and are characterized in that the materials used function both as a sensor and an actuator. Electroactive polymers (EAPs) are differentiated by the main groups, the ionic and electronic EAPs, which can be divided further into additional subgroups. The mode of action of EAPs will be explained hereafter, without being limited thereto, using dielectric EAPs, a subset of electronic EAPs. The basic structure resembles the operation of plate capacitors with a mechanically elastic dielectric and can be used therefore both as sensors and as actuators. Consequently, in the first mode an actuation by the actuator is sensed due to a change in capacitance, which is exerted as a result of a force application to the electromechanical switching element, therefore the artificial muscles, as a result of which the elastic dielectric of the electromechanical switching element deforms. The mode of action of electroactive polymers is based on an electronic charge transport. The advantages of electroactive polymers result from the high achievable expansions, which can be achieved, and the low density of the polymers and the free malleability. Accordingly, these are light, flexible, and silent actuators, which have a high energy density. The encapsulated actuators, which depending on the load can be used virtually under all ambient conditions, moreover, have a very low material cost. In the second mode, in which the electromechanical switching element functions as an actuator, an electrical voltage is applied to the electrodes of the electromechanical switching element, so that the dielectric is compressed due to the attracting charge and experiences an expansion, which is perpendicular to the field direction. The electrostatic pressure, which causes the deformation, is determined, inter alia, by the applied voltage. The use of a shape-memory alloy concerns materials that undergo a reversible structural transformation at a specific temperature, which proceeds with a change in the external geometry. Because of the good temperature behavior, positioning movements can be readily realized by an electrical current, and a cost-effective solution arises as a result. Moreover, the shape-memory alloys offer the advantage that they can be changed back to their original shape, if thermal energy is no longer introduced. Shape-memory alloys can transmit very large forces without noticeable fatigue and have a high specific work capacity while having a simultaneously small installation space. Piezoelectric elements are ceramic sensor-actuator modules and can be employed in particular for use under harsh ambient conditions. These utilize the effect either to carry out a mechanical movement when a voltage is applied or to generate an electrical voltage and therefore a signal when a mechanical force is applied. Piezoelectric elements in this case can be specific crystals or piezoelectric ceramics, therefore polycrystalline materials, which produce a change in shape at rather low voltages. According to the invention, it is moreover conceivable to use a combination of the aforementioned embodiments, i.e., electroactive polymers, shape-memory alloys, or piezoelectric elements. In this case, for example, one embodiment can be designed as a sensor and another as an actuator.

A further advantage is achievable in that the actuator has at least one activation element and/or at least one pressure element. In this case, the activation element has the task of applying a force to the electromechanical switching element, in particular in the first mode, so that this can be sensed by the electromechanical switching element. It is conceivable, for example, that the activation element has an appropriate design that causes a change in capacitance in the electromechanical switching element, as a result of which a specific signal can be generated that leads to a change into the second mode. The activation element can be designed such that the electromechanical switching element is compressed in the horizontal or vertical direction. Accordingly, for example, this can be a pin-like design or a conically tapered or pointed shape of the actuator. Consequently, this can concern elements attached in addition to the actuator or designs that can be predetermined directly by the actuator itself. A pressure element of the invention can enable, for example, a blocking function for the actuator or a misuse detection. In this regard, the actuator at at least one end has a special shape or a specially shaped element, which is designed such that movement of the actuator out of the actuating device is prevented. In this case, the geometric dimensions of the pressure element are designed such that during a movement toward the electromechanical switching element. a mechanical force is also exerted on it as a result, so that the electromechanical switching element is deformed hereby and a signal is therefore generated. If the electromechanical switching element is in the first mode, the blocking element is used in addition so that the actuator cannot be moved out of the actuating device, but a blocking function results from the electromechanical switching element and the geometric form of the pressure element, because the pressure element is made larger than the space located between the electromechanical switching element. The pressure element therefore forms an end of the electromechanical switching element, which is located at the opposite end of the activating element.

It is conceivable according to the invention that the electromechanical switching element and/or the electronic unit can be connected to a central locking system and/or a passive entry system of a vehicle. This has the advantage that at least one electromechanical switching element and/or the electronic unit can receive a signal that can produce a change in mode in the electromechanical switching element or a command in the electronic unit for the change in mode in the electromechanical switching element. Consequently, even before an actuation of the actuator by application of force to the movable part, a change in mode or an advance warning for a change in mode can be produced. Thus, it is conceivable, for example, that the electromechanical switching element is previously in a stand-by or sleep mode, in which there is only a low power consumption, and it is awakened by a passive entry or a central locking system, and can be switched into the first or second mode. Accordingly, an opening request is sensed, which can be evaluated by the electronic unit for an authorized or on-demand opening of the movable part.

A further advantage can be achieved in that at least one further electromechanical switching element is provided, which is designed to sense an authorized opening operation. In this regard, the further electromechanical switching element can be designed only as a sensor, only as an actuator, or as a sensor-actuator module. This has the result that in particular a misuse detection can be sensed or detected, which, for example, is caused by an improper opening or by vandalism. A warning signal, for example, can be generated as a result that indicates the misuse of the actuating device and senses a forced opening. A misuse detection functions in such a way here that the further electromechanical switching element by application of a mechanical force to the movable part is moved into an open position in which the opening is released, so that the pressure element exerts a force on the at least second electromechanical switching element and thus causes a change in capacitance which is detected by the electronic unit. Because of its geometric form, the pressure element blocks mechanically at the further electromechanical switching element and prevents the movable part from being opened by force. Depending on the state of the central locking system or of the passive entry system, the electronic unit can either provide a short warning that this is the wrong way of opening the movable part, or it can provide a continuous warning signal and an unauthorized opening of the movable part can be indicated.

It is conceivable according to the invention that the electromechanical switching element can be switched into the second mode only after sensing. Accordingly, the electromechanical switching element in the original state is in the first mode and is switched into the second mode only after sensing, for example, by the actuator and/or a central locking system and/or a passive entry system. It is achieved as a result that an unintentional release of the actuator by the electromechanical switching element is prevented. This improves safety, on the one hand, and the probability of failure of the actuating device, on the other.

Further measures improving the invention emerge from the following description of a few exemplary embodiments of the invention, which are shown schematically in the figures. All features and/or advantages, emerging from the claims, the description, or the drawing, including structural details, spatial arrangements, and process steps, can be essential to the invention both in themselves and in the most diverse combinations. It must be noted that the figures are merely descriptive in nature and are not intended to restrict the invention in any form.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
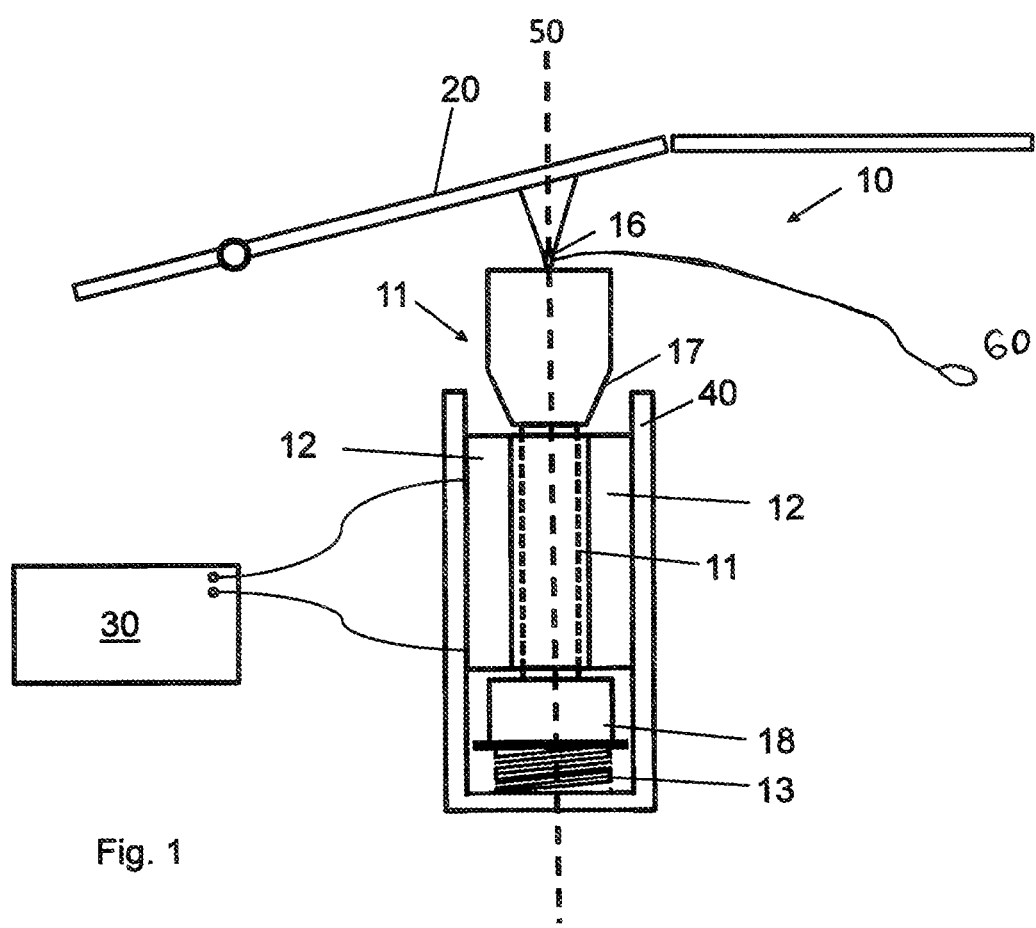
FIG. 1 shows an embodiment of an actuating device of the invention.

An embodiment of actuating device 10 of the invention is shown in FIG. 1. In the depicted form, electromechanical switching element 12, most of an actuator 11, pressure element 18, and first spring element 13 are located in a housing 40. The housing in this case is made cylindrical or polygonal and is opened toward the one short side, so that a part of the actuator 11 and of activation element 17 extends out of housing 40. Actuator 11 in this case has an activation element 17, which is located at the upper end of actuator 11 and therefore emerges from housing 40 at least partially, whereby activation element 17 on the side that looks at or into the housing has a conically or obliquely-planar tapering design. As a result, the diameter or the edge dimension of activation element 17 is made smaller by a certain amount relative to the topmost end of actuator 11. A cylindrical part of actuator 11 is disposed at the conically or obliquely-planar tapering end of activation element 17, whereby the cylindrical or polygonal part of actuator 11 in its diameter or edge dimension is at most the size of the conical or obliquely-planar end of activating element 17. This part of actuator 11 runs within housing 40 in which electromechanical switching element 12 is situated. Therefore, the cylindrical or polygonal part of actuator 11 is surrounded within housing 40 by electromechanical switching element 12, so that electromechanical switching element 12 can exert a force on actuator 11 and the latter is held by switching element 12. Alternatively, electromechanical switching element 12 can also be located only on one side of actuator 11, whereby the geometry of actuator 11 would need to be adapted accordingly and the rear side of actuator 11 in this case would be planar or guided in a guide groove. In FIG. 1 pressure element 18, which is also designed with a larger diameter relative to the cylindrical or polygonal actuator 11, is located at the bottom end of actuator 11. First spring element 13, which with its one end rests against housing 40 and with the other end against pressure element 18, is situated at pressure element 18. In FIG. 1, actuating device 10 and therefore electromechanical switching element 12 are in the first mode in which movable part 20 closes an opening. Actuator 11 in this regard is operationally connected to movable part 20, whereby the actuator 11 has an emergency mechanism 16, by which the operative connection between actuator 11 and movable part 20 can be separated by pulling the Bowden cable 60. In the shown position, spring element 13 is in a compressed position, the force of the electromechanical switching element, acting on actuator 11, being greater than the spring force of spring element 13. In the shown first mode, electromechanical switching element 12 is connected as a sensor and is linked to electronic unit 30 such that a change in capacitance of electromechanical switching element 12 due to a mechanical force application by actuator 11 is detected and sensed, whereby electronic unit 30 thereupon applies a voltage to electromechanical switching element 12, so that it is brought into the second mode, therefore into the actuator function. If electronic unit 30 switches electromechanical switching element 12 into the actuator mode, thus this results in a change in the shape of electromechanical switching element 12, in which electromechanical switching element 12 contracts, so that forces from electromechanical switching element 12 no longer act on actuator 11 and pressure element 18 can move accordingly in housing 40 toward movable part 20. Actuator 11 is moved toward movable part 20 by the spring force of spring element 13, so that due to the operative connection between actuator 11 or activation element 17 and movable part 20, movable part 20 springs open or releases the opening at least partially. In the no longer shown second mode in which electromechanical switching element 12 functions as an actuator, electromechanical switching element 12 contracts such that it is moved toward housing 40, so that sufficient space is released for pressure element 18 to be able to move in housing 40 toward movable part 20. The operative connection between actuator 11 and movable part 20 is brought about hereby by a hook connection, whereby the hook is situated on movable part 20 on an axis 50 and interacts via a corresponding counterpart, situated on activation element 17 and on axis 50. In this case, the connection between movable part 20 and activation element 17 can be released, e.g., in that actuator 11 moves on a circular path with activation element 17 in such a way that the hook on movable part 20 is released by the corresponding counterpart, which moves on the circular path with activation element 17. The rotational movement of actuator 11 or of activation element 17 in this case can also be brought about by electromechanical switching element 12 or a torsion spring.

Figure 2:
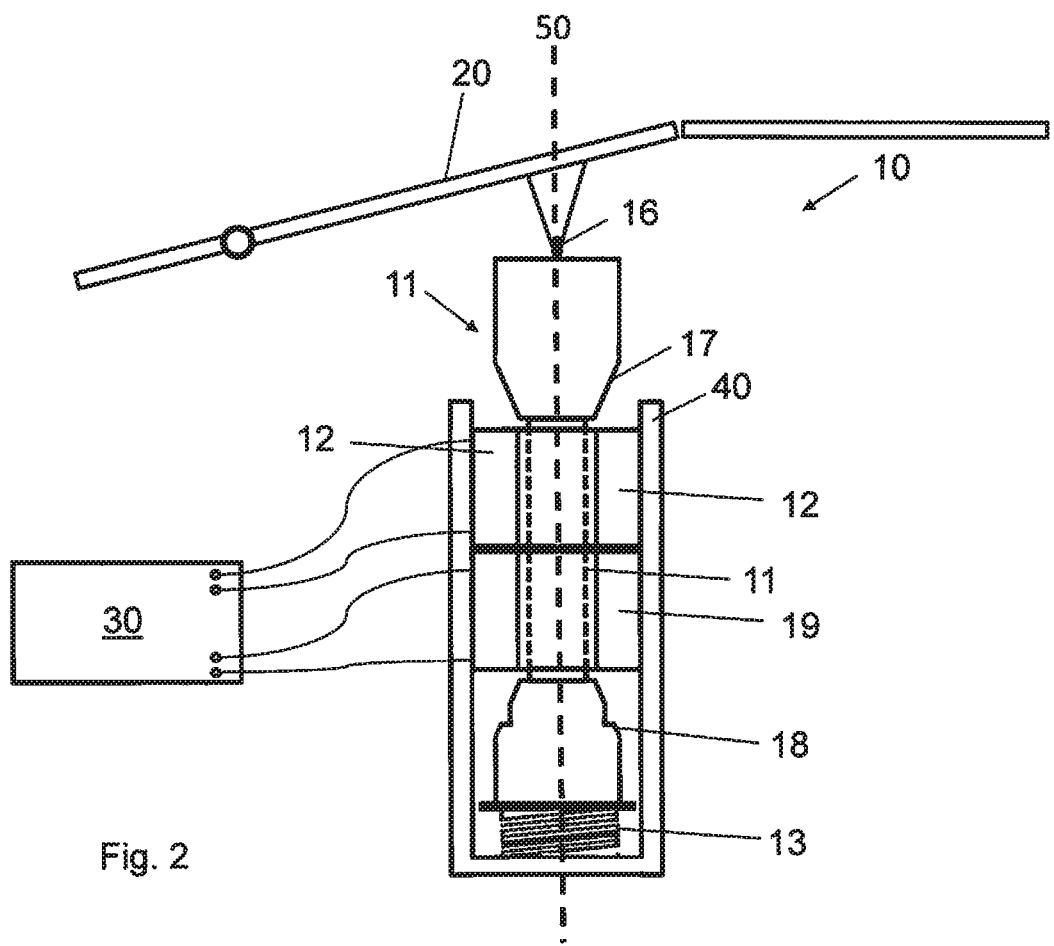
FIG. 2 shows an embodiment of an actuating device of the invention.

An embodiment of actuating device 10 of the invention is shown in FIG. 2, whereby in this case electromechanical switching element 12 is also in the first mode, in which electromechanical switching element 12 can sense a force application by actuator 11 or activation element 17. In addition to first electromechanical switching element 12, there is a further electromechanical switching element 19 in FIG. 2, which can also function both as a sensor and as an actuator or solely as a sensor or solely as an actuator. The further electromechanical switching element 19 can sense a force application of pressure element 18, as a result of which an improper opening or movement of movable part 20 can be detected. If movable part 20 is moved out of its original position improperly, thus the further electromechanical switching element 19 can detect this because pressure element 18, which also has a conically or obliquely-planar tapering shape, can sense a change in capacitance in electromechanical switching element 19 and simultaneously due to the shape of pressure element 18 can prevent it from moving actuator 18 out of housing 40. In this respect, pressure element 18 can also be designed in such a way that it prevents an outward movement by means of a specific shape, a mechanical barrier, or a mechanical resistance. Accordingly, a mechanical force is exerted on actuator 11 by electromechanical switching element 19 as well. Only if electronic unit 30, which is firstly connected to first electromechanical element 12 and to the second electromechanical switching element 19, releases these, i.e., switches to the second or actuator mode, electromechanical switching elements 12 and 19 contract in such a way that, as described in FIG. 1, there is sufficient space in housing 40 that the actuator or pressure element 18 can move with its widest section through housing 40. Electronic unit 30 is designed in such a way that a control or regulation of the two electromechanical switching elements 12 and 19 can be achieved independently of one another. Therefore, firstly electromechanical switching element 19 can be connected, for example, to a central locking system or a passive entry system of a vehicle and thereby can realize an authorized access. In this regard, electromechanical switching element 19 can be released, for example, by a passive entry system or the released central locking system, so that after actuation of actuator 11 by movement of movable part 20, electromechanical switching element 12 senses an opening request by the user and after the signal is processed by electronic unit 30, releases actuator 11.

Figure 3:
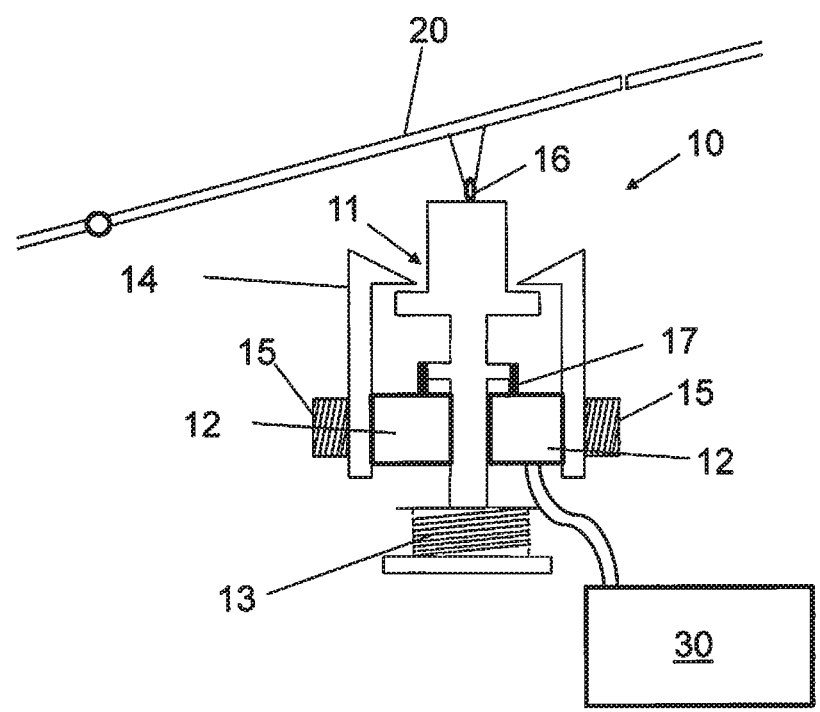
FIG. 3 shows an embodiment of an actuating device of the invention.

FIG. 3 shows an embodiment of actuating device 10 of the invention, whereby a locking mechanism 14 acts together with actuator 11. Locking mechanism 14 in this case is made hook-shaped, so that it can work together with a collar element of actuator 11. Hook-shaped locking mechanism 14 prevents actuator 11 with the collar-shaped part from being able to be moved past locking mechanism 14 in its closed position. Consequently, a movement of actuator 11 toward movable part 20 is prevented. Moreover, locking mechanism 14 works together with a second spring element 15 and electromechanical switching element 12. In this regard, the spring force of spring element 15 in the first mode of the electromechanical switching element is greater than the force of electromechanical switching element 12, which acts on locking mechanism 14. Therefore, locking mechanism 14 is held in a closed position in which actuator 11 cannot be moved toward movable part 20. Located on actuator 11 in FIG. 3 is an activation element 17, which acts during a movement of actuator 11, due to a force application on movable part 20, so that a change in capacitance is brought about in electromechanical switching element 12. Said change in capacitance is detected and evaluated by electronic unit 30, so that electromechanical switching element 12 then changes into the second mode in which electromechanical switching element 12 exerts a force on locking mechanism 14 that is greater than the spring force of spring element 15. Therefore, locking mechanism 14 is pressed toward spring element 15 and actuator 11 is released for a movement toward movable part 20. As a result, actuator 11 is moved by spring element 13 toward movable part 20 by the generated spring force.

Figure 4:
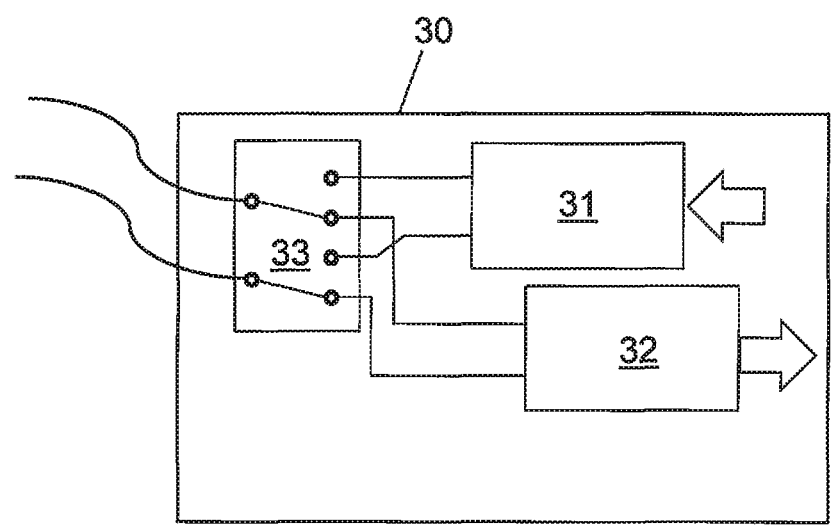
FIG. 4 shows a schematic illustration of the electronic unit of the invention.

Electronic unit 30 is illustrated schematically in FIG. 4. In this case, electronic unit 30 includes, inter alia, of a voltage supply 31, which supplies electromechanical switching elements 12 and/or 19 with a voltage. In addition, electronic unit 30 has a sensor control 32 and a changeover switch 33. Sensor control 32 evaluates the change in capacitance due to a force application to electromechanical switching elements 12 and/or 19 and provides a suitable signal to changeover switch 33, which switches electromechanical switching elements 12 and/or 19 from the first mode into the second mode. Either voltage supply 31 or sensor control 32 is connected to electromechanical switching elements 12 and/or 19 in changeover switch 33 by switching from the first to the second mode or vice versa.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An actuating device for a movable part, the actuating device comprising:
    a first spring element;
    an electronic unit;
    an actuator; and
    an electromechanical switching element that is changeable between a first mode and a second mode, the movable part being maintained in a closed position when the electromechanical switching element is in the first mode and the movable part being moved into an open position when the electromechanical switching element is in the second mode,
    wherein, in the first mode, the electromechanical switching element directly contacts and retains the actuator, such that movement of the actuator towards the movable part is restricted,
    wherein, in the second mode, the electromechanical switching element releases the actuator and upon release of the actuator, the actuator moves toward the movable part to open the movable part due to a force applied by the first spring element that acts on the actuator,
    wherein the electromechanical switching element has an electroactive polymer and/or a piezoelectric element,
    wherein the electronic unit controls the first and second modes of the electromechanical switching element, and
    wherein a mechanical emergency mechanism is provided, with which the movable part is adapted to be actuated independently of the actuator, the movable part being operatively connected to the actuator via the mechanical emergency mechanism, and wherein the movable part is adapted to be released from the closed position into the open position by pulling a Bowden cable connected to the mechanical emergency mechanism to separate the operative connection between the movable part and the actuator.

2. The actuating device according to claim 1, wherein the actuator has at least one activation element and/or at least one pressure element.

3. The actuating device according to claim 1, wherein the electromechanical switching element and/or the electronic unit are connectable to a control device of a vehicle, a central locking system and/or a passive entry system of a vehicle.

4. The actuating device according to claim 1, wherein a further electromechanical switching element is provided, which senses an authorized opening operation.

5. The actuating device according to claim 1, wherein the electromechanical switching element is adapted to be switched into the second mode only after a sensing operation.

6. The actuating device according to claim 1, wherein the movable part is a cover of a vehicle body opening.

* * * * *